United States Patent
Kusanagi

(10) Patent No.: US 12,196,202 B2
(45) Date of Patent: Jan. 14, 2025

(54) OIL PUMP DEVICE

(71) Applicant: MIKUNI CORPORATION, Tokyo (JP)

(72) Inventor: Hideaki Kusanagi, Takizawa (JP)

(73) Assignee: MIKUNI CORPORATION, Tokyo (JP)

( * ) Notice: Subject to any disclaimer, the term of this patent is extended or adjusted under 35 U.S.C. 154(b) by 91 days.

(21) Appl. No.: 17/832,151

(22) Filed: Jun. 3, 2022

(65) Prior Publication Data
US 2022/0412350 A1 Dec. 29, 2022

(30) Foreign Application Priority Data
Jun. 24, 2021 (JP) .................. 2021-105041

(51) Int. Cl.
*F04C 14/06* (2006.01)
*F04C 2/10* (2006.01)
(Continued)

(52) U.S. Cl.
CPC ............. *F04C 14/06* (2013.01); *F04C 2/10* (2013.01); *F04C 14/08* (2013.01); *F04C 14/28* (2013.01);
(Continued)

(58) Field of Classification Search
CPC .......... F04C 14/06; F04C 14/08; F04C 14/28; F04C 2/10; F04C 2/102; F04C 2240/40;
(Continued)

(56) References Cited

U.S. PATENT DOCUMENTS 4,177,016 A * 12/1979 Aude ................... F04B 15/02
417/430
8,734,136 B2 * 5/2014 Kranzle .............. A47L 15/4225
417/430
(Continued)

FOREIGN PATENT DOCUMENTS

CN 115523137 * 12/2022
DE 102012204533 * 7/2020
(Continued)

*Primary Examiner* — Charles G Freay
*Assistant Examiner* — Benjamin Doyle
(74) *Attorney, Agent, or Firm* — STAAS & HALSEY LLP

(57) ABSTRACT

The present invention provides an oil pump device capable of preventing foreign matters from getting caught at a sliding part of an oil pump, and thus of preventing a situation where the oil pump is locked and prevented from rotating. The oil pump device includes an oil pump connected to a supply target apparatus by a hydraulic circuit, the oil pump discharging and supplying oil to the supply target apparatus through the hydraulic circuit; a motor driving the oil pump; a trapping member interposed along the hydraulic circuit, the trapping member trapping a foreign matter mixed in the oil discharged from the oil pump; and a motor control unit controlling the motor to perform a normal control mode of driving the oil pump in a normal control rotation range and perform, at operational start of the oil pump, a lock-avoiding mode of driving the oil pump with a lock-avoiding rotational speed set in advance as a lower limit.

5 Claims, 4 Drawing Sheets

(51) Int. Cl.
*F04C 14/08* (2006.01)
*F04C 14/28* (2006.01)
*F16H 57/04* (2010.01)

(52) U.S. Cl.
CPC .. *F04C 2240/40* (2013.01); *F04C 2270/0525* (2013.01); *F04C 2270/40* (2013.01); *F16H 57/0436* (2013.01)

(58) Field of Classification Search
CPC .......... F04C 2270/0525; F04C 2270/40; F16H 57/0404; F16H 57/0436; F16H 57/0441; F16N 13/00; F16N 13/18; F16N 13/20; F04B 49/00; F01M 1/02; F01M 2001/0215; F01M 2001/0238; F01M 1/16
USPC .......................................................... 184/26
See application file for complete search history.

(56) References Cited

U.S. PATENT DOCUMENTS

| | | | | |
|---|---|---|---|---|
| 8,810,418 | B2* | 8/2014 | Houle | B60K 1/02 |
| | | | | 184/26 |
| 2006/0120888 | A1* | 6/2006 | Kitano | F16H 61/0031 |
| | | | | 417/1 |
| 2008/0121464 | A1* | 5/2008 | Ledger | B60W 10/30 |
| | | | | 184/6.13 |
| 2009/0105918 | A1* | 4/2009 | Kobayashi | F16H 61/0031 |
| | | | | 192/3.3 |
| 2011/0129356 | A1* | 6/2011 | Kobayashi | F16H 61/0031 |
| | | | | 417/44.1 |
| 2011/0135499 | A1* | 6/2011 | Lee | F04B 49/06 |
| | | | | 417/44.1 |
| 2012/0245820 | A1* | 9/2012 | Miyamoto | F16H 61/0031 |
| | | | | 701/102 |
| 2015/0032316 | A1* | 1/2015 | Chin | B60W 10/115 |
| | | | | 903/902 |
| 2016/0208719 | A1* | 7/2016 | Kawatsu | F04B 17/05 |
| 2019/0078566 | A1* | 3/2019 | Inoue | F04C 2/16 |
| 2019/0181723 | A1* | 6/2019 | Yamaguchi | F04C 2/102 |
| 2020/0132059 | A1* | 4/2020 | Ikemoto | B60W 10/06 |
| 2020/0240418 | A1* | 7/2020 | Correia | F04B 49/065 |
| 2020/0292054 | A1* | 9/2020 | Kawanishi | F16H 57/0404 |
| 2022/0170455 | A1* | 6/2022 | Leleu | F04C 14/08 |

FOREIGN PATENT DOCUMENTS

| | | | |
|---|---|---|---|
| JP | 2010-242599 | | 10/2010 |
| JP | 2012197715 | * | 10/2012 |
| JP | 2012197843 A | * | 10/2012 |
| JP | 2012197848 A | * | 10/2012 |
| JP | 2013119895 A | * | 6/2013 |
| JP | 2013170624 A | * | 9/2013 |
| JP | 2014034983 A | * | 2/2014 |
| JP | 2014077549 A | * | 6/2014 |
| JP | 5732555 B2 | * | 6/2015 |
| JP | WO 2015136749 A1 | * | 9/2015 |
| JP | WO 2015046075 A1 | * | 3/2017 |
| JP | 2020066369 A | * | 4/2020 |
| JP | 2020148150 A | * | 9/2020 |

* cited by examiner

OIL PUMP DEVICE

CROSS REFERENCE TO RELATED APPLICATIONS

This application claims the priority benefit of Japanese Patent Application No. 2021-105041 filed on Jun. 24, 2021, the contents of which are incorporated herein by reference.

BACKGROUND OF THE INVENTION

Field of the Invention

The present invention relates to an oil pump device.

Description of the Related Art

As a type of oil pump device, Patent Literature 1 discloses an electric oil pump device for an automatic transmission mounted in a vehicle, for example. The oil pump device is provided with a trochoidal-type oil pump that is driven by a motor, and oil discharged from the oil pump is supplied to the automatic transmission through a hydraulic circuit. Oil possibly contains foreign matters such as metal powder and dust due to various reasons. Such foreign matters may not only cause malfunction or failure of the automatic transmission, but also obstruct rotation of the oil pump.

For example, a trochoidal-type oil pump transfers oil using a change in capacity when an inner rotor is relatively rotated inside an outer rotor. A small foreign matter flows with oil to a downstream side through a clearance at a sliding part between the rotors, but a large foreign matter gets caught at the sliding part. An engine-driven oil pump may keep rotating by grinding a foreign matter that is caught with a drive torque that is large enough. However, with an electric oil pump device, there is no surplus drive torque of a motor, and relative rotation of the rotors is obstructed by the foreign matter and the oil pump is prevented from rotating. In the following description, this phenomenon will be referred to as locking of an oil pump. Moreover, in the case where the size of a motor is increased to increase the drive torque, problems such as an increase in cost, an increase in the size of the oil pump device and the like may be caused.

To prevent foreign matters from getting caught, Patent Literature 1 discloses a measure to be taken in a case where the oil pump is stopped in a high temperature range. When the oil pump stops in a state where a foreign matter is caught at the sliding part, the temperature is then reduced, and thus the clearance at the sliding part is reduced. Accordingly, the amount of caught foreign matters is gradually increased as the clearance is reduced, and even when the oil pump is rotated forward and backward, locking cannot be solved and operation cannot be restarted. According to the technique of Patent Literature 1, to prevent such a situation, when the oil pump is stopped in the high temperature range, the oil pump is repeatedly driven for a short time every predetermined period of time to regularly remove the foreign matters.

CITATION LIST

Patent Literature

[Patent Literature 1] Japanese Patent Laid-Open No. 2010-242599

However, the technique described in Patent Literature 1 is merely a measure to be taken after foreign matters are caught. Accordingly, foreign matters that are caught are sometimes not removed even when the oil pump is driven, and in such a case, there is a grave problem that the oil pump stays in the locked state and the operation cannot be restarted.

The present invention is for solving such a problem, and is aimed at providing an oil pump device capable of preventing foreign matters from getting caught at a sliding part of an oil pump, and thus of preventing a situation where the oil pump is locked and prevented from rotating.

SUMMARY OF THE INVENTION

To achieve the object described above, an oil pump device of the present invention includes: an oil pump connected to a supply target apparatus by a hydraulic circuit, the oil pump discharging and supplying oil to the supply target apparatus through the hydraulic circuit; a motor driving the oil pump; a trapping member interposed along the hydraulic circuit, the trapping member trapping a foreign matter mixed in the oil discharged from the oil pump; and a motor control unit controlling the motor to perform a normal control mode of driving the oil pump in a normal control rotation range and perform, at operational start of the oil pump, a lock-avoiding mode of driving the oil pump with a lock-avoiding rotational speed set in advance as a lower limit.

In another mode, at a first time of starting operation of the oil pump after the oil pump device is activated, the motor control unit may identify the operational start of the oil pump and perform the lock-avoiding mode.

In another mode, the motor control unit may repeat operation and stop of the oil pump during operation of the oil pump device, and, every time operation of the oil pump that is stopped is restarted, the motor control unit may identify the operational start of the oil pump and perform the lock-avoiding mode.

In another mode, at a time of starting operation of the oil pump at a time of first operation of the oil pump device after manufacture, the motor control unit may identify the operational start of the oil pump and perform the lock-avoiding mode.

In another mode, at a time of starting operation of the oil pump at a time of first operation of the oil pump device after performance of maintenance, the motor control unit may identify the operational start of the oil pump and perform the lock-avoiding mode.

In another mode, there may be further included a reset input unit capable of being operated as appropriate, in which, when the oil pump device is activated in a state where the reset input unit is operated, the motor control unit may identify first operation after the manufacture or first operation after performance of the maintenance, and perform the lock-avoiding mode at a time of starting operation of the oil pump.

In another mode, at operational start of the oil pump after the oil pump device is activated, the motor control unit may perform the lock-avoiding mode for a first execution time set in advance when the reset input unit is not operated, and perform the lock-avoiding mode for a second execution time set in advance to a time longer than the first execution time when the reset input unit is operated and the first operation after the manufacture or the first operation after the performance of the maintenance is identified in relation to the oil pump device.

In another mode, the motor control unit may perform the lock-avoiding mode for a third execution time set in advance at a first time of starting operation of the oil pump after the oil pump device is activated, and perform the lock-avoiding mode for a fourth execution time set in advance to a time shorter than the third execution time every time the operation of the oil pump that is stopped is restarted during the operation of the oil pump device.

In another mode, the lock-avoiding rotational speed may be set on a higher rotation side of the normal control rotation range, and the motor control unit may drive the oil pump at the lock-avoiding rotational speed in the lock-avoiding mode.

In another mode, the lock-avoiding rotational speed may be set within the normal control rotation range, when a target rotational speed of the oil pump set in the normal control mode is below the lock-avoiding rotational speed, the motor control unit may drive the oil pump at the lock-avoiding rotational speed in the lock-avoiding mode, and when the target rotational speed set in the normal control mode is at or greater than the lock-avoiding rotational speed, the motor control unit may drive the oil pump at the target rotational speed in the lock-avoiding mode.

With the oil pump device of the present invention, foreign matters may be prevented from getting caught at a sliding part of the oil pump, and thus, a situation where the oil pump is locked and prevented from rotating may be prevented.

DETAILED DESCRIPTION OF THE INVENTION

Hereinafter, an embodiment in which the present invention is embodied as an oil pump device for a travel drive device for an electric vehicle will be described. In the following description, the electric vehicle will simply be referred to as a vehicle.

Figure 1:
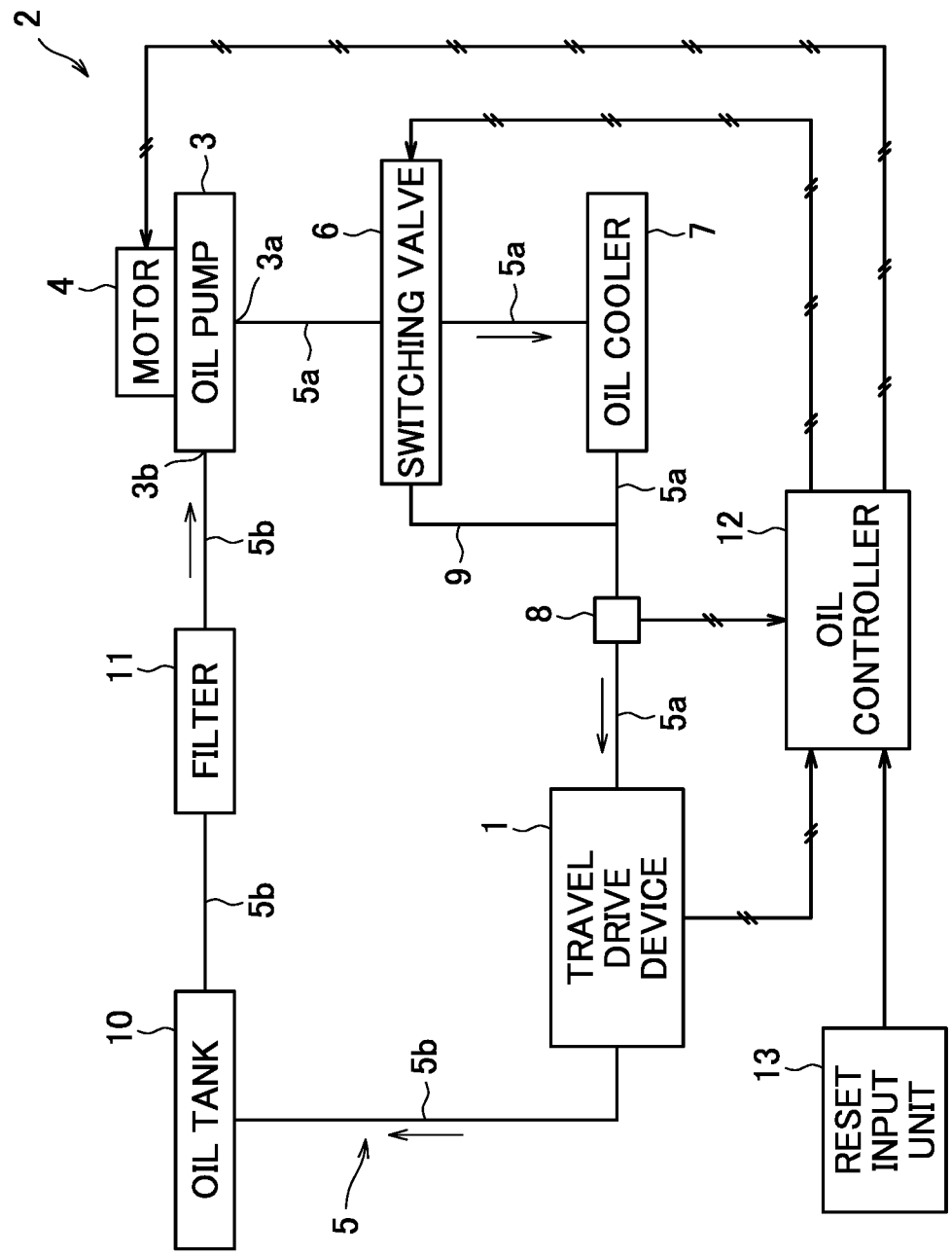
FIG. 1 is an overall configuration diagram showing an oil pump device of an embodiment.

FIG. 1 is an overall configuration diagram showing the oil pump device of the present embodiment.

Although not shown in FIG. 1, a travel drive device 1 of the present embodiment includes a travel motor as a power source, a generator for electric power generation, a transmission for changing the speed of rotation of the travel motor, a reducer for reducing the speed of rotation of the travel motor, and the like. In the present embodiment, the travel drive device 1 corresponds to "supply target apparatus" of the present invention. For example, the travel motor is a brushless DC motor, and an output shaft thereof is coupled to front wheels of the vehicle through the generator, the transmission, and the reducer.

The travel drive device 1 is controlled by a travel controller, not shown, but contents of control are not directly relevant to the present invention, and only an outline will be given. For example, when an accelerator of the vehicle is operated and the travel motor is driven by power supplied from a battery, not shown, a drive torque therefrom is transmitted to the front wheels of the vehicle through the generator, the transmission, and the reducer, thereby causing the vehicle to travel. At the time of deceleration of the vehicle, rotation of the front wheels is transmitted to the generator through the reducer and the transmission, and power generated as a result is used to charge the battery. Note that the configuration of the travel drive device 1 may be changed as appropriate without being limited to the one described above.

Each device constituting the travel drive device 1 needs to be lubricated and cooled. For example, bearings of the travel motor and the generator, or gear trains of the transmission and the reducer need to be lubricated for smooth sliding. Furthermore, the travel motor and the generator have to be cooled to prevent overheating due to heat generation caused by loss occurring at a coil, a core or the like during operation.

To achieve such lubrication and cooling, the travel drive device 1 is provided with an oil pump device 2, and details thereof will be given below.

An oil pump 3 of the oil pump device 2 is configured as a trochoidal-type oil pump driven by a motor 4, and is connected to the travel drive device 1 through a circulation path 5. In the present embodiment, the circulation path 5 corresponds to "hydraulic circuit" of the present invention. The motor 4 is capable of driving the oil pump 3 at any rotational speed, and the amount of discharged oil from the oil pump 3 is adjusted according to the rotational speed.

The circulation path 5 includes a supply circulation path 5a connecting a discharge port 3a of the oil pump 3 and an inlet side of the travel drive device 1, and a discharge circulation path 5b connecting an outlet side of the travel drive device 1 and a suction port 3b of the oil pump 3. Oil discharged from the discharge port 3a of the oil pump 3 is supplied to the travel drive device 1 through the supply circulation path 5a, and oil, after serving to perform lubrication and cooling, is discharged from the travel drive device 1, and is sucked in from the suction port 3b of the oil pump 3 through the discharge circulation path 5b.

A switching valve 6, an oil cooler 7, and an oil temperature sensor 8 are interposed along the supply circulation path 5a, in this order from the oil pump 3 side. The switching valve 6 and a part, of the supply circulation path 5a, downstream from the oil cooler 7 are connected by a bypass 9. Oil from the oil pump 3 is guided to the supply circulation path 5a side toward the oil cooler 7 or to the bypass 9 side according to switching of the switching valve 6. Accordingly, oil that is cooled by flowing through the oil cooler 7 or oil that bypassed the oil cooler 7 is supplied to the travel drive device 1. Moreover, the temperature of oil that is supplied to the travel drive device 1 in such a manner is detected by the oil temperature sensor 8.

With respect to the discharge circulation path 5b, an oil tank 10 and a filter 11 are interposed therealong, in this order from the travel drive device 1 side. Oil discharged from the travel drive device 1 is returned and stored in the oil tank 10 through the discharge circulation path 5b, and is then sucked into the oil pump 3 again from the oil tank 10, through the discharge circulation path 5b and the filter 11.

Metal powder, dust and the like, sometimes collectively referred to as foreign matters in the following description, may sometimes get mixed into the oil due to various reasons. For example, after the oil pump device 2 and the travel drive device 1 are manufactured, fine metal powder and the like generated by a cutting process may possibly be attached on the inside thereof. Furthermore, for some time after manufacture, wear progresses at sliding parts of the oil pump device 2 and the travel drive device 1 due to initial running-in, and fine metal powder and the like are generated and get mixed into the oil. Metal powder due to wear keeps being generated after the initial running-in, albeit in a reduced amount. For example, the sliding parts are parts between rotors of the oil pump 3, gear trains of the transmission and the reducer, and the like. The part between the rotors of the oil pump 3, that is one of the sliding parts, is a part where foreign matters get caught, and is thus distinguished in the following description by being referred to as a pump sliding part.

Furthermore, foreign matters may also get mixed into the oil at the time of maintenance of the oil pump device 2 and the travel drive device 1. Maintenance refers to replacement of parts such as the oil pump 3 or a pipe, or replacement of each device constituting the travel drive device 1, and foreign matters such as metal powder attached inside a replaced part or device gets mixed into the oil. Moreover, in the case where oil replacement is performed in the maintenance, foreign matters are possibly already mixed in the oil.

Foreign matters of various sizes may possibly get mixed into the oil due to reasons as described above, and a foreign matter having a certain size possibly causes a problem by getting caught in the pump sliding part to cause locking or to greatly damage the pump sliding part, for example. As a countermeasure, the filter 11 is provided on the circulation path 5, and a mesh size of the filter 11 is set such that even a foreign matter having a smallest particle diameter that may cause catching or damage to the pump sliding part as described above may be trapped. Accordingly, oil that flowed through the filter 11 may be considered to not include foreign matters that may get caught at the pump sliding part. In the present embodiment, the filter 11 corresponds to "trapping member" of the present invention.

Note that the configuration of the oil pump device 2 is not limited to the one described above, and may be freely changed. For example, the oil cooler 7 and the bypass 9 may be omitted, an oil reservoir may be provided below the oil pump 3 instead of the oil tank 10, or the position of the filter 11 on the circulation path 5 may be changed.

The oil pump device 2 is provided with an oil controller 12 for controlling a state of supply of oil to the travel drive device 1. Each device constituting the travel drive device 1, the oil temperature sensor 8, and a reset input unit 13 are connected to an input side of the oil controller 12, and operation information of each device constituting the travel drive device 1, detection information from the oil temperature sensor 8, and an operation state of the reset input unit 13 are input to the oil controller 12. Although details will be given later, the reset input unit 13 is a device for causing the oil controller 12 to recognize first operation after the oil pump device 2 is manufactured, and first operation after maintenance is performed.

The oil controller 12 controls a rotational speed of the oil pump 3 and a switching state of the switching valve 6 to maintain each device of the travel drive device 1 in a well lubricated state and to maintain the travel motor and the like in an appropriate temperature range by suppressing heat generation. Accordingly, the motor 4 of the oil pump 3 and the switching valve 6 are connected to an output side of the oil controller 12. In the present embodiment, the oil controller 12 corresponds to "motor control unit" of the present invention. Contents of control by the oil controller 12 are basically the same as a general oil pump device 2, and thus, only an outline will be given; control at this time will be referred to as a normal control mode in the following description.

When a power switch of the vehicle is turned on, the oil controller 12 is activated together with a travel controller, and the oil pump device 2 is activated. For example, even when the travel motor is operated according to operation of the accelerator, if the temperature of the oil is low, the oil controller 12 may set a target rotational speed Ntgt of the oil pump 3 to 0 rpm to keep the oil pump 3 in a stopped state. Then, when operation of the travel motor continues and the oil temperature is gradually increased, the switching valve 6 is switched to the bypass 9 side and cooling of the oil by the oil cooler 7 is stopped, and then, the target rotational speed Ntgt is increased from 0 rpm and the oil pump 3 is driven by the motor 4 at low-speed rotation. Then, when the oil reaches a high temperature, the switching valve 6 is switched to the supply circulation path 5a side and oil is cooled by the oil cooler 7, and also, the target rotational speed Ntgt is reset to an increase side, and the rotational speed of the oil pump 3 is increased.

Contents of control of the oil pump device 2 based on the oil temperature have been described above, but also with respect to the operation state and the like of each device of the travel drive device 1, control of the oil pump device 2 is performed based thereon. As a result, the oil pump 3 in the normal control mode is controlled between 0 rpm corresponding to stop and a predetermined rotational speed, or more specifically, a highest rotational speed required for lubrication and cooling of the travel drive device 1, and such a rotation range will hereinafter be referred to as a normal control rotation range.

When a foreign matter mixed in the oil gets caught at the pump sliding part, the oil pump 3 is placed in a locked state where rotation cannot be performed. The technique described in Patent Literature 1 is a measure that is taken after a foreign matter gets caught, and does not solve such a problem.

In view of such a problem, the present inventor focused attention on the relationship between catching of a foreign matter at the pump sliding part and the rotational speed of the oil pump 3. That is, a foreign matter that gets caught at the pump sliding part has a certain size, but a foreign matter having such a size passes through the pump sliding part without getting caught under a condition of a further increased rotational speed of the oil pump 3. This phenomenon is estimated to be due to an increase in the amount of oil that flows through the pump sliding part caused by an increase in the rotational speed that thereby causes a foreign matter to be transferred by the flow of the large amount of oil without getting caught at the pump sliding part.

Accordingly, it can be understood that, even if a foreign matter gets caught at the pump sliding part when the oil pump 3 is operated in the normal control rotation range, the foreign matter may be prevented from getting caught when the rotational speed of the oil pump 3 is increased. The foreign matter passing through the pump sliding part by the flow of the oil is trapped by the filter 11 interposed along the circulation path 5, and thus, rotation of the oil pump 3 does not have to be increased thereafter and a shift to an operation in the normal control rotation range, or in other words, an original normal control mode, is enabled.

Based on the above findings, the oil pump device 2 of the present embodiment performs a lock-avoiding mode at the start of operation of the oil pump 3, instead of the normal control mode, the lock-avoiding mode being a mode in which the rotational speed of the oil pump 3 is increased. Accordingly, a rotational speed higher than the normal control rotation range, such as, in the present embodiment, a highest rotational speed of the oil pump 3 that can be achieved by driving by the motor 4, is set in advance as a lock-avoiding rotational speed N.

The time of operational start of the oil pump 3 when the lock-avoiding mode is to be performed roughly includes the following three times, namely, the time of start of normal operation, the time of start of operation after manufacture, and the time of start of operation after maintenance.

The time of start of operation after manufacture is a timing, after the oil pump device 2 and the travel drive device 1 are manufactured and mounted in the vehicle, when the oil pump device 2 is first activated and operation of the oil pump 3 is started. Foreign matters such as metal powder may be attached inside the oil pump device 2 and the travel drive device 1 after manufacture, and the lock-avoiding mode is performed at such a timing to prevent catching.

The time of start of operation after maintenance is a timing, after maintenance of the oil pump device 2 or the travel drive device 1 is performed, when the oil pump device 2 is first activated and operation of the oil pump 3 is started. Foreign matters such as metal powder may be attached inside a part or a device replaced by the maintenance, and also, foreign matters may be already mixed in the oil, and the lock-avoiding mode is performed at such a timing to prevent catching.

The time of start of normal operation is any timing when operation of the oil pump 3 is started, excluding the time of start of operation after manufacture and the time of start of operation after maintenance. When the oil pump device 2 and the travel drive device 1 operate, metal powder and the like may be generated at the sliding part due to wear, and the lock-avoiding mode is performed at such a timing to prevent catching. In the present embodiment, the oil pump 3 is not continuously operated during operation of the oil pump device 2, and the oil pump 3 is repeatedly operated and stopped as appropriate according to the oil temperature, the operation state of the travel drive device 1, or the like.

Accordingly, the lock-avoiding mode is performed not only when the oil pump 3 is first operated after the oil pump device 2 is activated, but also every time the oil pump 3 restarts operation after stopping, by identifying such a timing to be the time of start of normal operation.

As described above, the purpose of the lock-avoiding mode is to prevent a foreign matter mixed in the oil from getting caught, by causing the foreign matter to pass through the pump sliding part until it is trapped by the filter 11. Accordingly, the lock-avoiding mode has to be performed until the foreign matter in the oil is trapped by the filter 11, but an appropriate execution time t is different between the time of start of normal operation, and the time of start of operation after manufacture and the time of start of operation after maintenance. Furthermore, in relation to the time of start of normal operation, the appropriate execution time t for the lock-avoiding mode is different between an initial time of start of normal operation of the oil pump 3 after the oil pump device 2 is activated and a second or later time of start of normal operation.

At the time of start of normal operation, foreign matters such as metal powder are generated at the pump sliding part due to wear, due to immediately preceding operation of the oil pump device 2 and the travel drive device 1; however, the generated amount is small, and foreign matters get mixed into the oil immediately after being generated. Accordingly, foreign matters that pass through the sliding part of the oil pump 3 together with the oil pass through the circulation path 5 and are swiftly trapped by the filter 11, and are prevented from being sucked into the oil pump 3 again. In this manner, the foreign matters are trapped by the filter 11 in a short time, and the execution time t for the lock-avoiding mode to be applied at the time of start of normal operation is set, in advance, relatively shorter than the time set for the time of start of operation after manufacture and the time of start of operation after maintenance.

More specifically, the execution time t for the lock-avoiding mode for the initial time of start of normal operation after the oil pump device 2 is activated is set to about 60 seconds, for example. In the present embodiment, the execution time t that is set to 60 seconds corresponds to "first execution time" or "third execution time" in the present invention. Due to the lock-avoiding mode at the initial time of start of normal operation, most of the foreign matters mixed in the oil are trapped by the filter 11. Then, at the time of restarting operation of the oil pump 3 that is stopped, or in other words, at the second or later time of start of normal operation, only a small amount of foreign matters that are newly generated due to wear has to be trapped by the filter 11, and thus, the execution time t for the lock-avoiding mode is set to a shorter time of about 15 seconds, for example. In the present embodiment, the execution time t that is set to 15 seconds correspond to "first execution time" or "fourth execution time" in the present invention.

On the other hand, at the time of start of operation after manufacture, foreign matters such as metal powder generated by cutting are attached on the inside of the oil pump device 2 and the travel drive device 1, and at the time of start of operation after maintenance, foreign matters such as metal powder are attached on the inside of a part or a device replaced by the maintenance. The attached amount of foreign matters such as metal powder tends to be greater compared with that of metal powder and the like generated due to wear at the time of start of normal operation described above. Moreover, even when oil flows through the circulation path 5, not all foreign matters that are attached are able to immediately come off and pass through the sliding part of the oil pump 3 together with the oil. Accordingly, assuming that there are foreign matters that take time to come off, the execution time t for the lock-avoiding mode, that is relatively long being about 180 seconds, for example, is set in advance for the time of start of operation after manufacture and the time of start of operation after maintenance. In the present embodiment, the execution time t that is set to 180 seconds corresponds to "second execution time" in the present invention.

The oil controller 12 controls the motor 4 for driving the oil pump 3, and thus, may recognize start of operation of the oil pump 3 based on control that the oil controller 12 performs. However, it is not possible to determine whether the start of operation corresponds to the time of start of normal operation, or to the time of start of operation after manufacture or the time of start of operation after maintenance. Accordingly, in a manufacturing factory for vehicles, for example, when the oil pump device 2 and the travel drive device 1 are manufactured and mounted in a vehicle, a manufacturing person operates the reset input unit 13 and perform test operation of the oil pump device 2. Furthermore, in a repair factory for vehicles, when maintenance of the oil pump device 2 or the travel drive device 1 is performed, a repair person operates the reset input unit 13 and perform test operation of the oil pump device 2.

Based on the operation of the reset input unit 13, the oil controller 12 recognizes that of the oil pump device 2 is activated for the first time after manufacture or maintenance. Then, when operation of the oil pump 3 is started based on the oil temperature, the operation state of the travel drive device 1, or the like, this is identified to be the time of start of operation after manufacture or the time of start of operation after maintenance. Moreover, in the case where operation of the oil pump 3 is started in a state where the reset input unit 13 is not operated, the oil controller 12 identifies the time of start of normal operation.

As described above, the reset input unit 13 is a device that a staff member operates as appropriate in the manufacturing factory or the repair factory for vehicles. Accordingly, the reset input unit 13 is provided at a part where it is not operated by a user of the vehicle by mistake, such as a hidden part inside the vehicle, for example.

Figure 2:
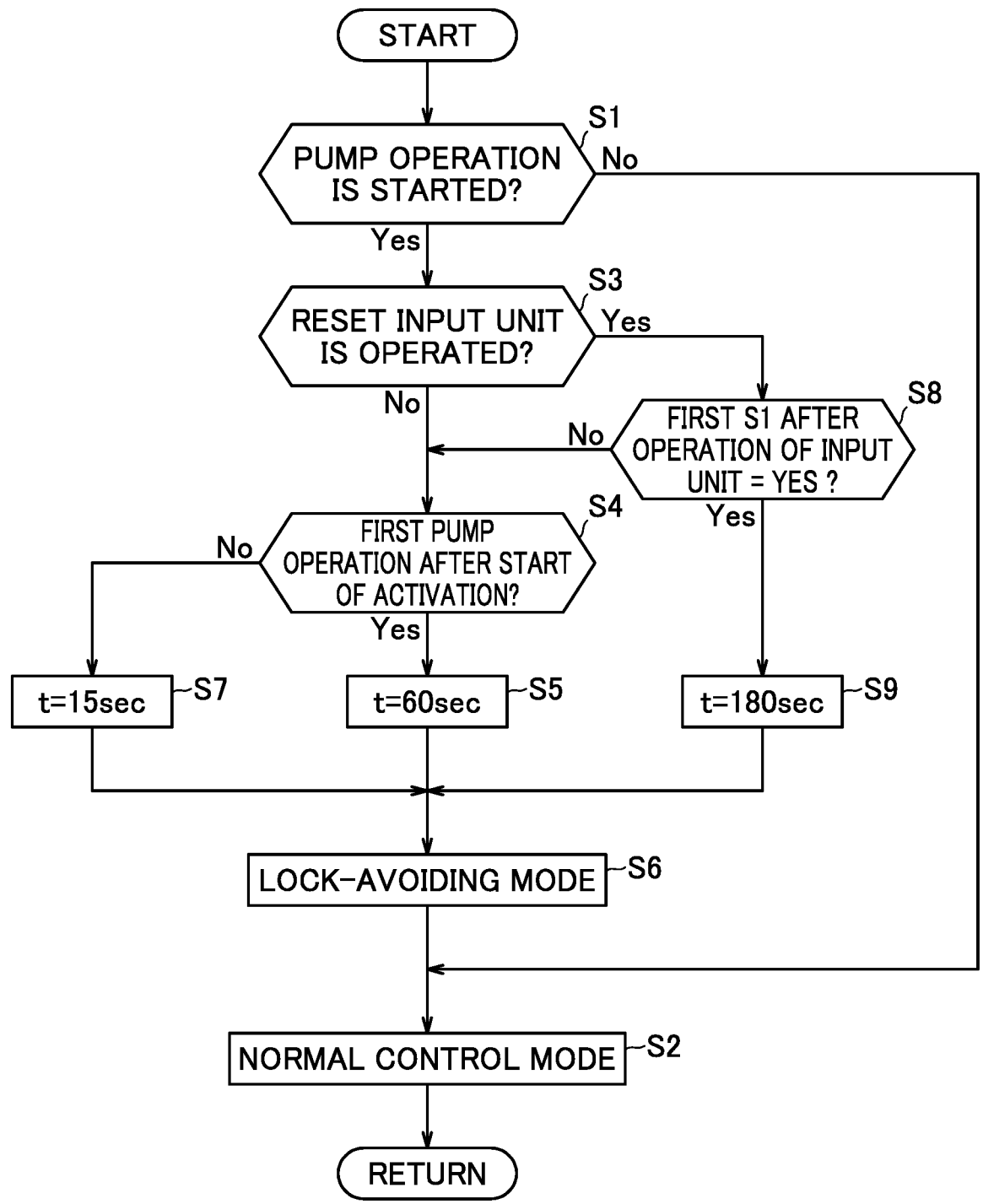
FIG. 2 is a flowchart showing an oil control routine performed by an oil controller.

Next, control of the oil pump device 2, or more particularly, control regarding the lock-avoiding mode, performed by the oil controller 12 will be described. When a power switch of the vehicle is turned on, the oil controller 12 performs an oil control routine shown in FIG. 2 at a predetermined control interval, and the oil pump device 2 is activated.

First, a situation where the lock-avoiding mode is performed at the time of start of normal operation when the reset input unit 13 is not operated will be described. In step S1, whether operation of the oil pump 3 is started is determined, and in the case of No (negative), a shift to step S2 takes place and the normal control mode is performed, and then, the routine is temporarily stopped. As described above, in the normal control mode, an operation state of the oil pump 3 is controlled based on the oil temperature, the operation state of the travel drive device 1, or the like. While the oil pump 3 is kept in a stopped state in the normal control mode, No is determined in step S1 even when the routine is started again, and the normal control mode in step S2 is continued.

Then, when operation of the oil pump 3 is determined to be started in the normal control mode, Yes (positive) is determined when step S1 is then performed, and step S3 is performed. In step S3, whether the reset input unit 13 is operated is determined, and because operation is not performed in this case, the time of start of normal operation is identified and No is determined. Then, step S4 is performed, and whether operation of the oil pump 3 is started for the first time after the start of activation of the oil pump device 2 is determined. Because operation of the oil pump 3 is first after the start of the activation, the initial time of start of normal operation is identified in this case, and step S5 is performed.

In step S5, the execution time t for the lock-avoiding mode is set to 60 seconds, and in the following step S6, the lock-avoiding mode is performed based on the execution time t that is set. Accordingly, in this case, the motor 4 is controlled and the oil pump 3 is driven at the lock-avoiding rotational speed N for 60 seconds. The target rotational speed Ntgt at this time is set to a value within the normal control rotation range, and the rotational speed of the oil pump 3 is increased from the target rotational speed Ntgt to the lock-avoiding rotational speed N corresponding to the highest rotational speed, and foreign matters are transferred by the flow of a large amount of oil. Accordingly, in the lock-avoiding mode, even a foreign matter that is large enough to get caught at the pump sliding part if the oil pump 3 is operated in the normal control rotation range passes through without getting caught at the pump sliding part. Moreover, the foreign matters are swiftly trapped by the filter 11 after flowing through the circulation path 5, and a situation where the foreign matters are sucked into the oil pump 3 again to be caught at the pump sliding part may be avoided.

During execution of the lock-avoiding mode, because the oil pump 3 is driven at the lock-avoiding rotational speed N that is higher than the normal control rotation range, a greater amount of oil is supplied to the travel drive device 1. However, unlike in the case where the amount of supply of oil become insufficient, a little excess does not cause a problem in relation to lubrication and cooling.

When the lock-avoiding mode in step S6 is ended, step S2 is performed, and the normal control mode is performed again. For example, in a situation where supply of oil should be continued according to the oil temperature, the operation state of the travel drive device 1 or the like at the time point, a predetermined target rotational speed Ntgt is set within the normal control rotation range and operation of the oil pump 3 is continued. Alternatively, in a situation where supply of oil is not necessary, the target rotational speed Ntgt is set to 0 rpm and the oil pump 3 is stopped. Then, in the normal control mode, when operation of the oil pump 3 that is temporarily stopped is determined to be restarted, Yes is determined in step S1, and in step S4 following step S3, No is determined because it is the second or later time of start of normal operation, and then, step S7 is performed. In step S7, the execution time t for the lock-avoiding mode is set to 15 seconds, and in the following step S6, the lock-avoiding mode is performed and the oil pump 3 is driven at the lock-avoiding rotational speed N for 15 seconds.

Because most of the foreign matters are trapped by the filter 11 at the initial time of start of normal operation, the execution time t for the lock-avoiding mode is reduced for the second and later times, but a small amount of foreign matters generated thereafter is trapped by the filter 11 with no problem during execution of the lock-avoiding mode. Thereafter, the lock-avoiding mode is performed for 15 seconds every time the operation of the oil pump 3 is stopped and restarted, as long as the oil pump device 2 continues to be activated, and foreign matters are thus trapped by the filter 11 and removed from the oil. As a result, there will be no foreign matters in the oil that are large enough possibly to get caught at the pump sliding part. Accordingly, foreign matters may be prevented from getting caught and resulting locking of the oil pump 3 may be prevented not only during execution of the lock-avoiding mode but also when the rotational speed of the oil pump 3 is reduced later due to a shift to the normal control mode.

Next, a situation where the lock-avoiding mode is performed at the time of start of operation after manufacture and at the time of start of operation after maintenance will be described. The lock-avoiding mode is the same for the start of operation in both cases, and is started based on operation of the reset input unit 13 in both cases. Accordingly, a situation where the lock-avoiding mode is performed at the time of start of operation after manufacture will be described as a representative case.

It is assumed that, after the oil pump device 2 and the travel drive device 1 are manufactured, the reset input unit 13 is operated by a manufacturing person, and that the power switch of the vehicle is turned on to perform test operation of the oil pump device 2.

When the routine is first started, No is determined in step S1, and step S2 is performed next, but when it is determined that operation of the oil pump 3 is to be started in the normal control mode, Yes is determined in step S1, and step S3 is then performed. In step S3, because the reset input unit 13 is operated, Yes is determined, and step S8 is performed next. In step S8, whether Yes is determined in step S1 for the first time after operation of the reset input unit 13, or in other words, whether the oil pump device 2 is activated for the first time after being manufactured and operation of the oil pump 3 is started, is determined. In the case where Yes is determined, the time of start of operation after manufacture is identified, and step S9 is performed to set the execution time t for the lock-avoiding mode to 180 seconds, and in the following step S6, the lock-avoiding mode is performed and the oil pump 3 is driven at the lock-avoiding rotational speed N for 180 seconds.

As a result, the lock-avoiding mode is continued longer than at the initial time of start of normal operation based on the setting in step S5. Foreign matters such as metal powder and the like attached to the inside of the oil pump device 2 and the travel drive device 1 come off during execution of the lock-avoiding mode, and are trapped by the filter 11 after passing through the pump sliding part. There may be foreign matters that do not come off, but foreign matters that keep being attached for 180 seconds will highly likely stay in an attached state thereafter. As a result, it can be estimated that oil no longer contains foreign matters that are large enough to get caught at the pump sliding part. Accordingly, as in the case of the time of normal operation, foreign matters may be prevented from getting caught at the pump sliding part, and resulting locking of the oil pump 3 may be prevented.

Then, a shift to the normal control mode in step S2 takes place, and when a determination is made to restart operation of the oil pump 3 that is temporarily stopped, step S8 is performed subsequent to steps S1 and S3. Because the determination of Yes in step S1 is not the first after operation of the reset input unit 13, No is determined in step S8, and step S4 is performed next. Then, because the lock-avoiding mode is already performed based on the execution time t set in step S9, No is determined in step S4, and the second or later time of start of normal operation is identified and a shift to step S7 takes place. Accordingly, the following processes are the same as those performed at the time of start of normal operation described above, and the lock-avoiding mode is performed in step S6 based on 15 seconds set in step S7.

According to the present embodiment described above, the lock-avoiding mode is performed at the time when operation of the oil pump 3 is started during operation of the oil pump device 2, and the oil pump 3 is driven at the lock-avoiding rotational speed N that is set on a higher rotation side of the normal control rotation range that is applied in the normal control mode. Accordingly, foreign matters are transferred by the flow of a large amount of oil, and are trapped by the filter 11 after passing through the pump sliding part without getting caught. Accordingly, foreign matters may be prevented from being sucked into the oil pump 3 again and thus may be prevented from getting caught at the pump sliding part and resulting locking of the oil pump 3 may be prevented not only during execution of the lock-avoiding mode but also when the lock-avoiding mode is ended and a shift to the normal control mode takes place.

Moreover, when foreign matters get caught at the pump sliding part, not only is the oil pump 3 locked, but damages may also be caused to the pump sliding part. When the clearance at the pump sliding part is increased by repeated infliction of damage, pump efficiency is reduced, but the lock-avoiding mode also greatly contributes to prevent such a problem.

Furthermore, avoiding locking of the oil pump 3 has an advantage that fail determination may be accurately performed in relation to the oil pump device 2. In the normal control mode, the oil pump 3 is driven at a desired rotational speed within the normal control rotation range, and when rotation of the oil pump 3 is slowed due to an increase in load or the like, supply current to the motor 4 is increased to maintain the desired rotational speed. When overload is caused due to some reason, overload is determined based on a drastic increase in supply current and fail determination is made, and driving of the oil pump 3 by the motor 4 is stopped. Because supply current is drastically increased also when the oil pump 3 gets locked due to catching of foreign matters, it is not possible to determine whether the state is caused by overload that is the original target of fail determination or by catching of foreign matters. In the present embodiment, locking due to catching of foreign matters is prevented, and thus, occurrence of overload may be determined with certainty when supply current to the motor 4 is drastically increased, and thus, fail determination may be accurately performed.

On the other hand, the lock-avoiding mode of increasing the rotational speed of the oil pump 3 does not cause problems in relation to lubrication and cooling of the travel drive device 1, but may possibly cause an increase in power consumption or operation noise of the motor 4, for example. Accordingly, where possible, the lock-avoiding mode is desirably swiftly ended to shift to the normal control mode after successfully preventing catching of foreign matters. From such a standpoint, in the present embodiment, the execution time t for the lock-avoiding mode is made different between the time of start of normal operation, and the time of start of operation after manufacture and the time of start of operation after maintenance. Moreover, in relation to the time of start of normal operation, the execution time t for the lock-avoiding mode is made different between the initial time of start of normal operation and the second or later time of start of normal operation.

More specifically, the longest execution time t for the lock-avoiding mode (for example, 180 seconds) is set for the time of start of operation after manufacture and the time of start of operation after maintenance because not all foreign matters such as metal powder and the like attached inside the oil pump device 2 and the travel drive device 1 come off immediately. Furthermore, a shorter execution time t for the lock-avoiding mode (for example, 60 seconds) is set for the initial time of start of normal operation because, although foreign matters such as metal powder due to wear are mixed in the oil, the foreign matters flow through the circulation path 5 together with the oil to be trapped by the filter 11. Furthermore, because most of the foreign matters are trapped by the filter 11 at the initial time of start of normal operation, the shortest execution time t for the lock-avoiding mode (for example, 15 seconds) is set for the second or later time of start of normal operation.

By setting the execution time t in the above manner, foreign matters may be reliably prevented from getting caught at the pump sliding part, and also, the lock-avoiding mode may be prevented from continuing unnecessarily, and thus, power consumption and operation noise of the motor 4 may be reduced.

In the embodiment described above, the highest rotational speed of the oil pump 3 is set as the lock-avoiding rotational speed N, but such a case is not restrictive. When taking power consumption and operation noise of the motor 4 into account, the lock-avoiding rotational speed N is desirably set on a lower rotation side as much as possible while allowing catching at the pump sliding part to be prevented. However, when the rotational speed of the oil pump 3 falls below the target rotational speed Ntgt that is set in the normal control mode, the amount of discharged oil may become insufficient and lubrication and cooling of the travel drive device 1 are possibly hindered. Accordingly, the oil pump 3 has to be driven at a rotational speed at or greater than the target rotational speed Ntgt that is set at the corresponding time point, not only in the normal control mode but also in the immediately preceding lock-avoiding mode.

Accordingly, to satisfy all the demands described above, it is considered to appropriately increase or decrease the lock-avoiding rotational speed N based on the target rotational speed Ntgt while setting the lock-avoiding rotational speed N in the normal control rotation range, and details will be given below as another example.

Another Example of Embodiment

Differences from the embodiment lie in processes by the oil controller 12, and the configuration shown in FIG. 1 and the like, for example, are the same as in the embodiment. Accordingly, differences will be mainly described, and redundant description of common configuration and common contents of control will be omitted.

In this other example, the lock-avoiding rotational speed N is set within the normal control rotation range. More specifically, when taking into account the purpose of the lock-avoiding mode, which is to prevent foreign matters from getting caught at the pump sliding part, if the lock-avoiding rotational speed N is set near a lower limit in the normal control rotation range, for example, the amount of oil that flows through the pump sliding part becomes insufficient and the desired object is not achieved. The lower limit of the rotational speed at which foreign matters may be prevented from getting caught is different depending on specifications and the like of the oil pump, but in the present embodiment, the lock-avoiding rotational speed N is set at a median value in the normal control rotation range based on the assumption that catching may be prevented if at or greater than the median value. Note that the median value is an example, and the rotational speed may be set to any value in the normal control rotation range as long as catching may be prevented.

Figure 3:
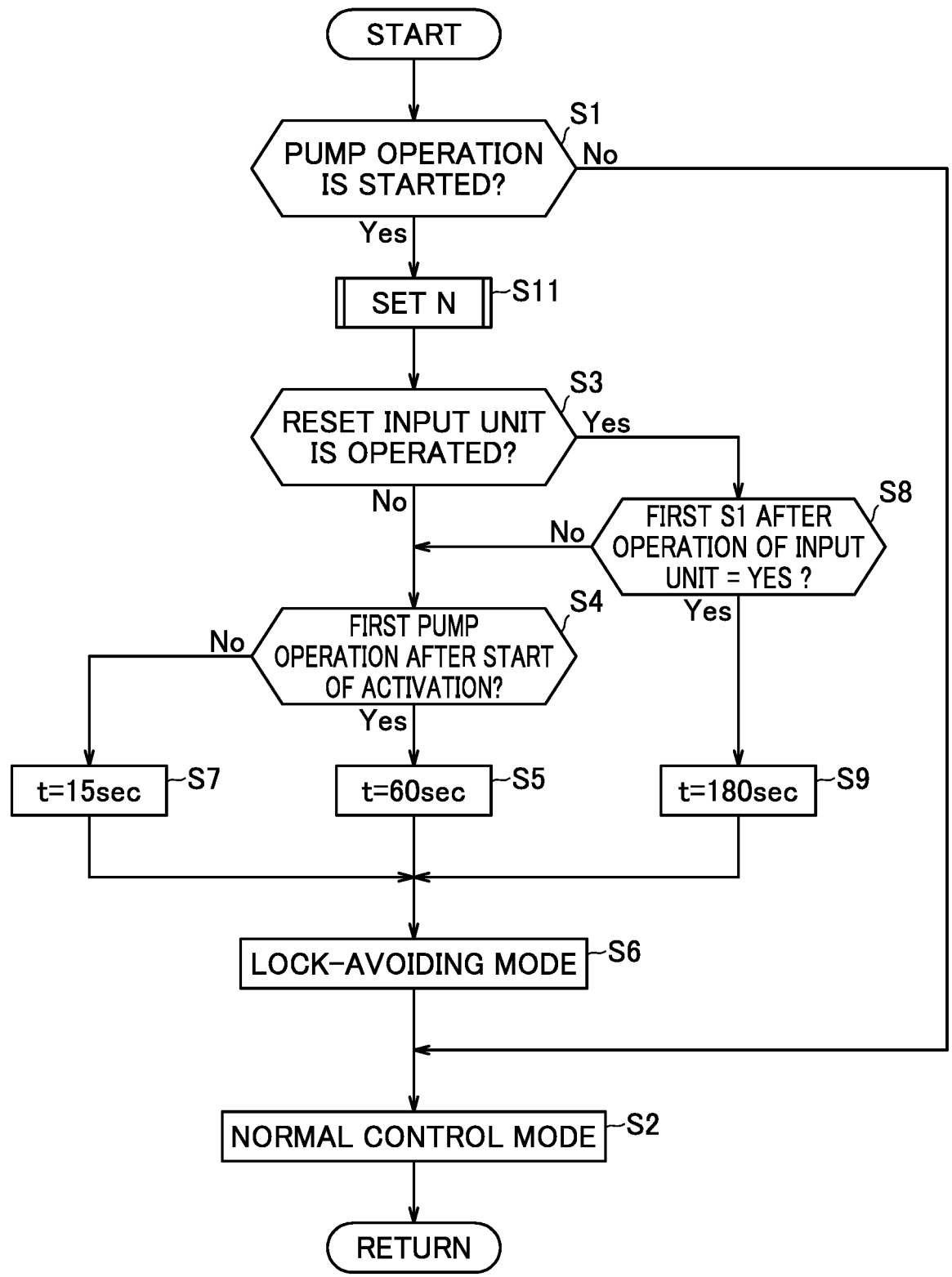
FIG. 3 is a flowchart showing the oil control routine performed by the oil controller according to another example.
Figure 4:
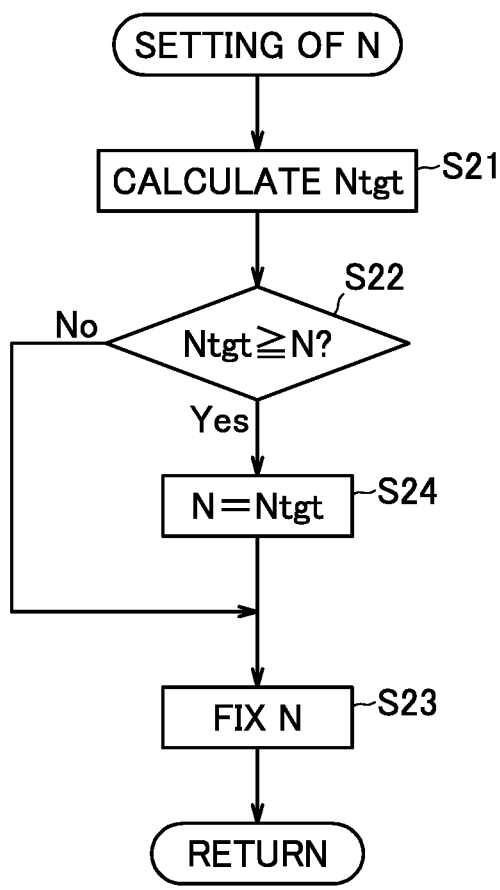
FIG. 4 is a flowchart showing a lock-avoiding rotational speed N setting routine performed by the oil controller according to the other example.

FIG. 3 is a flowchart showing the oil control routine performed by the oil controller 12 according to this other example, and FIG. 4 is a flowchart showing a lock-avoiding rotational speed N setting routine performed by the oil controller 12.

When the normal control mode is performed in steps S1, S2 in FIG. 3, and operation of the oil pump 3 is determined to be started, step S11 is performed subsequent to step S1. In step S11, a process of setting the lock-avoiding rotational speed N, or more specifically, a process of re-setting, to an increase side as necessary, the lock-avoiding rotational speed N that is set at the median value in the normal control rotation range, is performed. Then, the same processes as in the embodiment are performed, and the execution time t for the lock-avoiding mode is set depending on whether it is the initial time of start of normal operation, the second or later time of start of normal operation, or the time of start of operation after manufacture or the time of start of operation after maintenance (S5, S7, S9), and the lock-avoiding mode is performed based on the execution time t (S6), and then, a shift to the normal control mode is made (S2).

When a shift to step S11 is made, the routine in FIG. 4 is started. First, in step S21, the target rotational speed Ntgt is calculated based on the oil temperature, the operation state of the travel drive device 1, or the like. The target rotational speed Ntgt that is calculated takes the same value as the target rotational speed Ntgt that is later set in the normal control mode. In the subsequent step S22, whether the target rotational speed Ntgt is at or greater than the lock-avoiding rotational speed N is determined, and in the case of No, step S23 is performed and the lock-avoiding rotational speed N is fixed at the median value. In the case where Yes is determined in step S22, step S24 is performed and the target rotational speed Ntgt is set as the lock-avoiding rotational speed N, and the lock-avoiding rotational speed N is fixed in the subsequent step S23.

According to the control described above, in the case where the target rotational speed Ntgt below the lock-avoiding rotational speed N is set in the normal control mode, the oil pump 3 is driven, in the immediately preceding lock-avoiding mode, at the lock-avoiding rotational speed N that is set at the median value in the normal control rotation range. That is, the target rotational speed Ntgt at this time is possibly set near the lower limit in the normal control rotation range, for example, but the rotational speed of the oil pump 3 is increased from such a target rotational speed Ntgt to the lock-avoiding rotational speed N.

In the case where the target rotational speed Ntgt at or greater than the lock-avoiding rotational speed N is set in the normal control mode, the oil pump 3 is driven, in the immediately preceding lock-avoiding mode, at the target rotational speed Ntgt that is set as the lock-avoiding rotational speed N. That is, the oil pump 3 is controlled at the target rotational speed Ntgt on a higher rotation side of the lock-avoiding rotational speed N. As a result, regardless of the setting of the target rotational speed Ntgt in the normal control mode, the oil pump 3 is driven in either case with the lock-avoiding rotational speed N as the lower limit, and locking may thus be prevented.

In the case where the target rotational speed Ntgt at or greater than the lock-avoiding rotational speed N is set in the normal control mode, a state where a great amount of oil is required for lubrication or cooling of the travel drive device 1 may be assumed. The oil pump 3 at this time is driven at the target rotational speed Ntgt not only in the normal control mode but also in the immediately preceding lock-avoiding mode, and thus, the travel drive device 1 may be desirably lubricated and cooled without the amount of discharged oil becoming insufficient.

The mode of the present invention is not limited to the embodiment described above. For example, in the embodiment described above, the oil pump device 2 is for lubricating and cooling the travel drive device 1 for a vehicle, and includes the trochoidal-type oil pump 3, but the usage of the oil pump device 2, the type of the oil pump 3, and the like are not limited thereto.

For example, embodiment as an oil pump device for driving a hydraulic motor, a hydraulic cylinder or the like is also possible. In this case, oil that is discharged from an oil pump is switched by a control valve, and is supplied to the hydraulic motor, the hydraulic cylinder or the like as hydraulic oil to enable driving in a desired direction and at a desired speed. The oil pump is continuously driven during operation of the oil pump, but when the lock-avoiding mode is performed at the time of start of operation of the oil pump, the same effects may be achieved as those in the embodiment described above.

Furthermore, a vane-type or plunger-type oil pump may be used as the oil pump 3, for example. With the vane-type, the pump sliding part is between a tip end of a vane and an inner circumferential surface of a housing, and with the plunger-type, the pump sliding part is between an outer circumferential surface of a plunger and an inner circumferential surface of a sleeve. By applying the present invention, foreign matters may be prevented from getting caught at these pump sliding parts.

Furthermore, in the embodiment described above, the lock-avoiding mode is performed at each of the initial time of start of normal operation, the second or later time of start of normal operation, and the time of start of operation after manufacture and the time of start of operation after maintenance, but such a case is not restrictive. For example, the time of start of operation after manufacture and the time of start of operation after maintenance happen much less often than the time of start of normal operation, and thus, the lock-avoiding mode may be omitted in one or both of the two cases. Moreover, because most of the foreign matters are trapped by the filter 11 at the initial time of start of normal operation as described above, the lock-avoiding mode at the second or later time of start of normal operation may be omitted.

Furthermore, the execution time t for the lock-avoiding mode does not have to be set in the manner described in the embodiment described above. For example, the same execution time t may be set for the initial time of start of normal operation and the second or later time of start of normal operation. Moreover, different execution times t may be set for the time of start of operation after manufacture and the time of start of operation after maintenance. For example, at the time of start of operation after maintenance when only a replaced part is a new part, the attached amount of metal powder and the like is estimated to be smaller than at the time of start of operation after manufacture when everything is new, and thus, a shorter execution time t may be set.

Furthermore, the lock-avoiding rotational speed N may be varied instead of the execution time t for the lock-avoiding mode. For example, a first lock-avoiding rotational speed, a second lock-avoiding rotational speed, and a third lock-avoiding rotational speed with different values are set in advance, in this order from a high rotation side, and 60 seconds is set as the common execution time t for the lock-avoiding mode, for example. The oil pump 3 is driven at the first lock-avoiding rotational speed at the time of start of operation after manufacture and at the time of start of operation after maintenance, the oil pump 3 is driven at the second lock-avoiding rotational speed at the initial time of start of normal operation, and the oil pump 3 is driven at the third lock-avoiding rotational speed at the second or later time of start of normal operation. Moreover, although a detailed description will not be given, the execution time t and the lock-avoiding rotational speed N may both be varied.

Furthermore, in the embodiment described above, the oil controller 12 recognizes the time of start of operation after maintenance based on operation of the reset input unit 13, but such a case is not restrictive. When a part constituting the travel drive device 1 or the oil pump device 2 is replaced, attachment/removal of parts at the time may be electrically detected and be input to the oil controller 12 as attachment/removal information. For example, in the case where the oil pump 3 is removed and replaced with a new one, the oil controller 12 recognizes that the oil pump 3 is replaced, based on the input attachment/detachment information, and performs the lock-avoiding mode corresponding to the time of start of operation after maintenance. Accordingly, prior operation of the reset input unit 13 may be made unnecessary.

REFERENCE SIGNS LIST

1 travel drive device (supply target apparatus)
2 oil pump device
3 oil pump
4 motor
5 circulation path (hydraulic circuit)
11 filter (trapping member)
12 oil controller (motor control unit)
13 reset input unit

What is claimed is:

1. An oil pump device comprising: an oil pump connected to a supply target apparatus by a hydraulic circuit, the oil pump discharging and supplying oil to the supply target apparatus through the hydraulic circuit; a motor driving the oil pump; a trapping member interposed along the hydraulic circuit, the trapping member trapping a foreign matter mixed in the oil discharged from the oil pump; a motor control unit controlling the motor to perform a normal control mode of driving the oil pump in a normal control rotation range and perform, at operational start of the oil pump, a lock-avoiding mode of driving the oil pump with a lock-avoiding rotational speed set in advance, wherein, at a first time of starting operation of the oil pump after the oil pump device is activated, the motor control unit identifies the operational start of the oil pump and performs the lock-avoiding mode, oil pump device after manufacture, the motor control unit identifies the operational start of the oil pump and performs the lock-avoiding mode; and the motor control unit configured to receive a reset input signal, wherein when the oil pump device is activated in a state where the reset input signal is received, the motor control unit identifies first operation of the oil pump device after the manufacture or first operation after performing maintenance, and performs the lock-avoiding mode at a time of starting operation of the oil pump.

2. The oil pump device according to claim 1, wherein, at a time of starting operation of the oil pump after the oil pump device is activated, the motor control unit performs the lock-avoiding mode for a first execution time set in advance when the reset input signal is not received, and performs the lock-avoiding mode for a second execution time set in advance to a time longer than the first execution time when the reset input signal is received and the first operation after the manufacture or the first operation after the performance of the maintenance is identified in relation to the oil pump device.

3. An oil pump device comprising: an oil pump connected to a supply target apparatus by a hydraulic circuit, the oil pump discharging and supplying oil to the supply target apparatus through the hydraulic circuit; a motor driving the oil pump; a trapping member interposed along the hydraulic circuit, the trapping member trapping a foreign matter mixed in the oil discharged from the oil pump; a motor control unit controlling the motor to perform a normal control mode of driving the oil pump in a normal control rotation range and perform, at operational start of the oil pump, a lock-avoiding mode of driving the oil pump with a lock-avoiding rotational speed set in advance, wherein, at a first time of starting operation of the oil pump after the oil pump device is activated, the motor control unit identifies the operational start of the oil pump and performs the lock-avoiding mode, oil pump device after performance of maintenance, the motor control unit identifies the operational start of the oil pump and performs the lock-avoiding mode; and the motor control unit configured to receive a reset input signal, wherein when the oil pump device is activated in a state where the reset input signal is received, the motor control unit identifies first operation of the oil pump device after the manufacture or first operation after performing maintenance, and performs the lock-avoiding mode at a time of starting operation of the oil pump.

4. The oil pump device according to claim 3, wherein, at a time of starting operation of the oil pump after the oil pump device is activated, the motor control unit performs the lock-avoiding mode for a first execution time set in advance when the reset input signal is not received, and performs the lock-avoiding mode for a second execution time set in advance to a time longer than the first execution time when the reset input signal is received and the first operation after the manufacture or the first operation after the performance of the maintenance is identified in relation to the oil pump device.

5. An oil pump device comprising:
- an oil pump connected to a supply target apparatus by a hydraulic circuit, the oil pump discharging and supplying oil to the supply target apparatus through the hydraulic circuit;
- a motor driving the oil pump;
- a trapping member interposed along the hydraulic circuit, the trapping member trapping a foreign matter mixed in the oil discharged from the oil pump;
- a motor control unit controlling the motor to perform a normal control mode of driving the oil pump in a normal control rotation range and perform, at operational start of the oil pump, a lock-avoiding mode of driving the oil pump with a lock-avoiding rotational speed set in advance, wherein the motor control unit repeats operation and stop of the oil pump during operation of the oil pump device, and, every time operation of the oil pump that is stopped is restarted, the motor control unit identifies the operational start of the oil pump and performs the lock-avoiding mode, wherein the motor control unit performs the lock-avoiding mode for a third execution time set in advance at a first time of starting operation of the oil pump after the oil pump device is activated, and performs the lock-avoiding mode for a fourth execution time set in advance to a time shorter than the third execution time every time the operation of the oil pump that is stopped is restarted during the operation of the oil pump device.

* * * * *